(12) United States Patent
Paspek et al.

(10) Patent No.: US 11,707,745 B2
(45) Date of Patent: Jul. 25, 2023

(54) PROCESSES AND STRUCTURES FOR PLASTIC SEPARATION AND PRODUCTS OF SUCH PROCESSES

(71) Applicant: Broadview Group International, LLC, Brook Park, OH (US)

(72) Inventors: Stephen Carl Paspek, Broadview Heights, OH (US); Joseph Edward Bork, Westlake, OH (US); Alan Fredrick Schroeder, Cleveland, OH (US)

(73) Assignee: BROADVIEW GROUP INTERNATIONAL, LLC, Brook Park, OH (US)

( * ) Notice: Subject to any disclaimer, the term of this patent is extended or adjusted under 35 U.S.C. 154(b) by 443 days.

(21) Appl. No.: 16/219,019

(22) Filed: Dec. 13, 2018

(65) Prior Publication Data
US 2019/0176162 A1 Jun. 13, 2019

Related U.S. Application Data

(60) Provisional application No. 62/598,081, filed on Dec. 13, 2017.

(51) Int. Cl.
| | |
|---|---|
| *B02C 23/08* | (2006.01) |
| *B29B 17/02* | (2006.01) |
| *B29B 17/04* | (2006.01) |
| *D21B 1/06* | (2006.01) |
| *D21B 1/10* | (2006.01) |

(52) U.S. Cl.
CPC .............. *B02C 23/08* (2013.01); *B29B 17/02* (2013.01); *B29B 17/04* (2013.01); *D21B 1/061* (2013.01); *D21B 1/10* (2013.01); *B29B 2017/0217* (2013.01); *B29B 2017/0224* (2013.01); *B29B 2017/0286* (2013.01); *B29B 2017/044* (2013.01); *B29B 2017/0468* (2013.01); *B29B 2017/0488* (2013.01)

(58) Field of Classification Search
CPC ......... B02C 23/08; B29B 17/02; B29B 17/04; B29B 2017/0224; B29B 2017/0488; B29B 2017/0217; B29B 2017/0286; B29B 2017/044; B29B 2017/0468; D21B 1/061; D21B 1/01; Y02W 30/62; Y02W 30/52; Y02W 30/64
See application file for complete search history.

(56) References Cited

U.S. PATENT DOCUMENTS

| | | | | |
|---|---|---|---|---|
| 3,973,735 | A * | 8/1976 | Ito | B02C 17/002 241/73 |
| 4,072,273 | A * | 2/1978 | Reiniger | B02C 21/00 241/19 |
| 2008/0206094 | A1* | 8/2008 | Holloway | B09B 3/00 422/20 |

(Continued)

*Primary Examiner* — Jacob T Minskey
*Assistant Examiner* — S. Behrooz Ghorishi
(74) *Attorney, Agent, or Firm* — Wentsler LLC

(57) ABSTRACT

Methods and apparatus are provided for the separation of a feedstock stream comprising a principle component and at least one secondary component such that at least one component has greater friability that the others using a rotary impact separator. The methods allow the recovery of two or more streams, one rich in the more friable component, and one lean in the more friable component.

14 Claims, 12 Drawing Sheets

(56) References Cited

U.S. PATENT DOCUMENTS

| | | | |
|---|---|---|---|
| 2011/0111456 A1* | 5/2011 | Medoff | C13K 1/02 |
| | | | 435/68.1 |
| 2017/0058094 A1* | 3/2017 | Frenkel | B02C 19/00 |
| 2018/0015515 A1* | 1/2018 | Sivakumar | C04B 18/021 |
| 2019/0344285 A1* | 11/2019 | Grasso, Jr. | C03C 23/0085 |

* cited by examiner

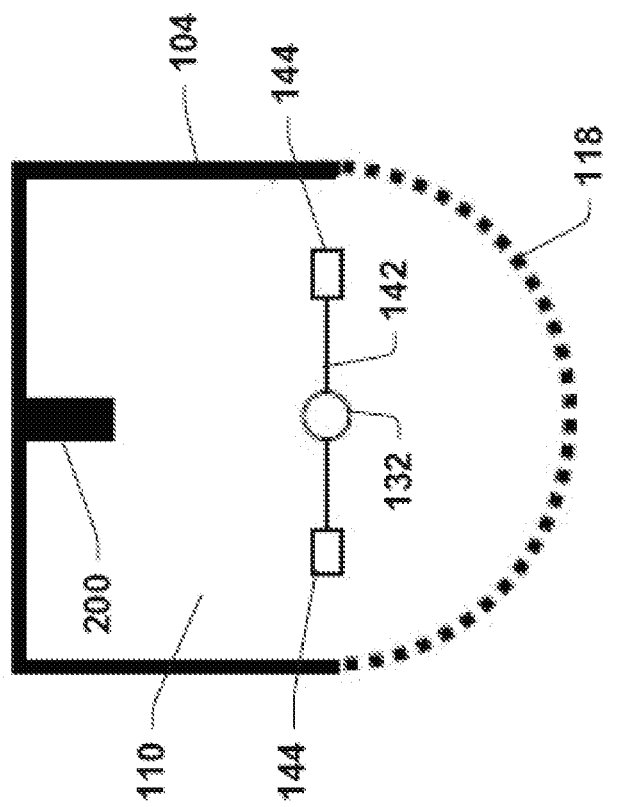
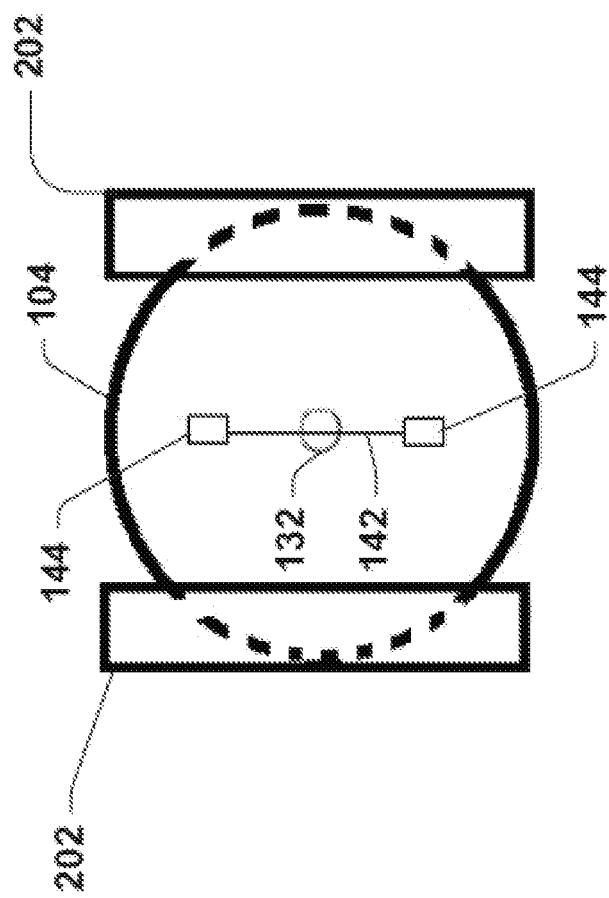
FIG. 2D
FIG. 2C

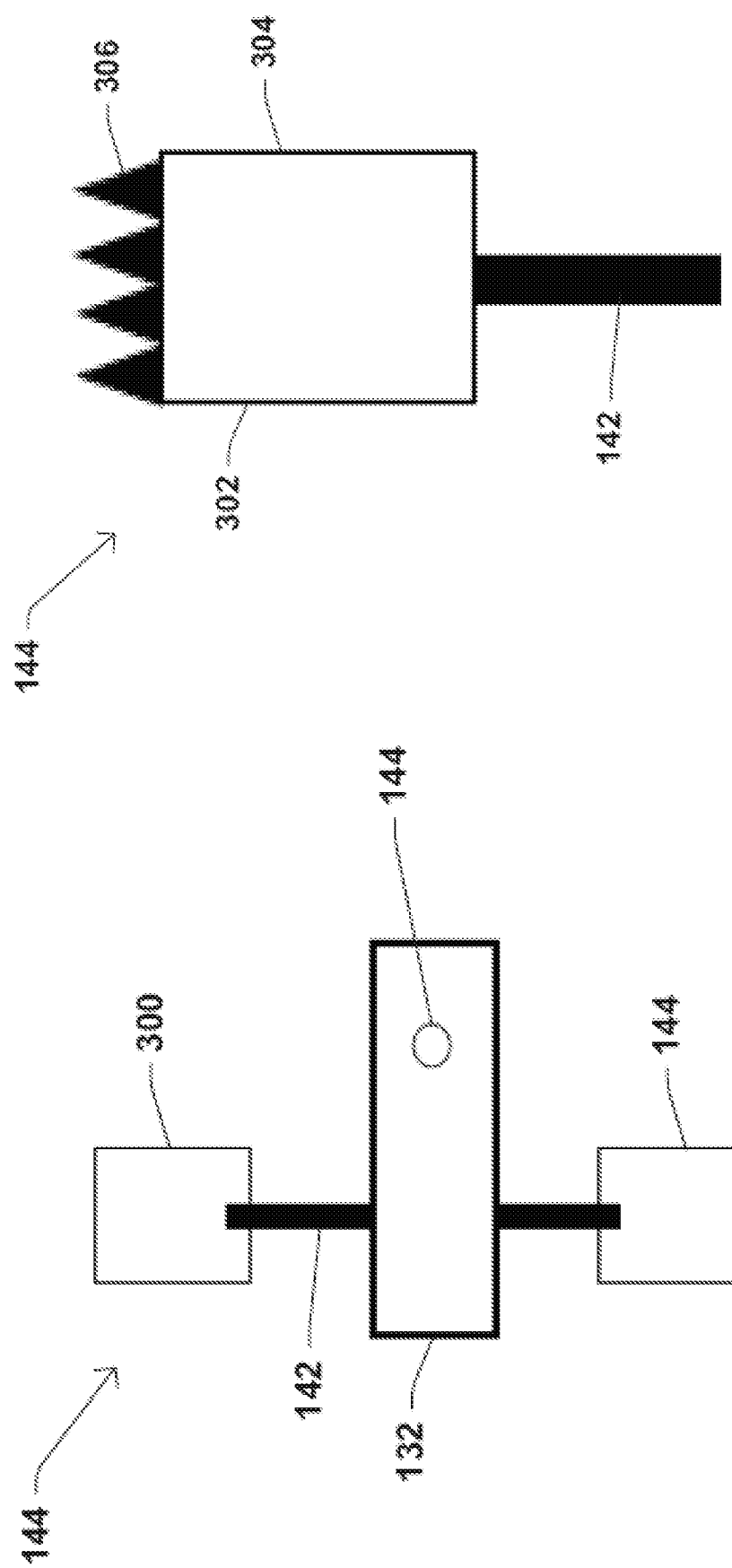

PROCESSES AND STRUCTURES FOR PLASTIC SEPARATION AND PRODUCTS OF SUCH PROCESSES

CROSS-REFERENCE TO RELATED APPLICATIONS

This application claims the benefit of priority of U.S. Provisional Patent Application No. 62/598,081, titled "PROCESSES AND STRUCTURES FOR PLASTIC SEPARATION AND PRODUCTS OF SUCH PROCESSES," filed on Dec. 13, 2017, the entire disclosure of which is hereby incorporated by reference.

TECHNICAL FIELD

The present application relates to methods for cleaning and separating shredded materials using a rotary impact separator (RIS). More specifically, the application relates to the separation of foreign materials from plastic-rich or paper-rich streams, creating products that are more useful in industrial, agricultural, or domestic applications.

BACKGROUND

The rotary impact separator has been previously described for the recycling of carpet and carpet-like materials in U.S. 2017/0305038, by separating the face fiber from the backing fiber, and both of the fiber components from the calcium carbonate-rich adhesive. It has now been discovered that this same device has utility in separating foreign materials from paper-rich or plastic-rich feedstocks.

Waste paper, including newsprint, office paper, books, magazines, cardboard, corrugated cardboard, packaging and the like ("Paper") can be converted into cellulose insulation by a process called fiberizing. In this process, the paper is first shredded, and the shredded paper is rubbed in between two rough surfaces to separate the individual cellulose fibers, decreasing the bulk density and increasing the insulating properties. However, the supply of clean waste paper is diminishing. Much of the paper coming from MRF's (Municipal Recycling Facilities) are contaminated with plastic and other debris, including plastic bottles, plastic bags, plastic film, aluminum cans and the like. Such debris causes significant wear and damage to manufacturing equipment, including the fiberizers. Ferrous debris is fairly easy to remove magnetically, but there is no good mechanical option for separating non-ferrous debris. Current technology is to dump the contaminated feedstock onto a moving conveyor belt, and to hand-pick out the contaminants, a process that is costly and inefficient. Even which such sorting, there can still be significant debris in the paper stream. Residual debris in the paper stream causes problems in downstream equipment, including plugging, wrapping, and fire due to excessive friction. There is a need for the efficient removal of debris with minimal loss of paper.

Agricultural plastic is used in a number of farming applications, including film to cover fields for moisture and weed control and to wrap silage for storage. Another major use is in irrigation tubing which is also referred to as drip tape. After a single use, this agricultural plastic is stripped from the fields or bales and is either burned or sent to a landfill. This incurs significant costs in transportation and tipping fees. The problem is exacerbated by the presence of as much as 50-70 wt % dirt adhering to the plastic, which prevents facile recycling of the polymer. The plastic can be washed, but due to the high dirt load, as much as 10 to 20 weights of dirty water are generated for each pound of plastic recycled. There is a need for an economical method of removing dirt from plastic to allow facile recycling.

SUMMARY

According to an aspect, a method for recovering two or more product streams from a feedstock is provided. The method comprises receiving the feedstock comprising a principal component and at least one secondary component. A friability of the principal component is different than the friability of the at least one secondary component. The method comprises passing the feedstock through a rotary impact separator. The method comprises collecting a principal component stream with reduced levels of the at least one secondary component.

According to an aspect, the feedstock comprises a polymeric material.

According to an aspect, the feedstock comprises a post-consumer polymeric material previously used in agriculture.

According to an aspect, the feedstock comprises post-industrial or post-consumer plastic, or mixtures thereof.

According to an aspect, the feedstock comprises a polymer-rich stream derived from a municipal recycling facility (MRF).

According to an aspect, the feedstock comprises a cellulose-rich stream.

According to an aspect, the feedstock comprises a stream derived from paper, newsprint, books and magazines.

According to an aspect, the feedstock comprises a stream derived from recycled paper, mixed paper, recycled cardboard, and mixtures thereof.

According to an aspect, the feedstock comprises a cellulose-rich stream which has been partially or fully processed into cellulose-rich insulation.

According to an aspect, the feedstock comprises a cellulose-rich stream derived from a municipal recycling facility (MRF).

According to an aspect, a method for recovering two or more product streams from a feedstock is provided. The method comprises receiving the feedstock comprising a principal component and at least one secondary component, wherein a friability of the principal component is different than the friability of the at least one secondary component. The method comprises passing the feedstock through a first impacting station to at least partially separate the feedstock into a separated feedstock. The method comprises passing the separated feedstock through a second impacting station to at least partially separate a principal component stream from the separated feedstock. The method comprises collecting a principal component stream with reduced levels of the at least one secondary component.

According to an aspect, a rotary impact separator for separating a material is provided. The rotary impact separator comprises a body portion having one or more walls. The walls define a substantially hollow chamber, and an inlet opening, in communication with the hollow chamber, through which the material is received. The walls define a first outlet opening, in communication with the hollow chamber, through which a first co-product of the material exits the hollow chamber. The walls define a second outlet opening, in communication with the hollow chamber, through which a second co-product of the material exits the hollow chamber. The rotary impact separator comprises an impact device extending at least partially into the hollow chamber defined within the body portion, the impact device configured to contact the material and separate the material into the first co-product and the second co-product.

According to an aspect, the impact device comprises a shaft that extends within the hollow chamber, the shaft configured to rotate within the hollow chamber.

According to an aspect, the impact device comprises one or more end effects attached to the shaft.

According to an aspect, the end effects extend substantially perpendicularly with respect to the shaft, the end effects configured to contact the material and separate the material into the first co-product and the second co-product.

According to an aspect, the end effects comprise at least one of: a paddle, a claw, a knife, a chain, a hammer, or a flail.

According to an aspect, the first co-product and the second co-product have a different material composition.

DESCRIPTION OF THE DRAWINGS

FIG. 2C is an illustration of a portion of an example rotary impact separator;

FIG. 2D is an illustration of a portion of an example rotary impact separator;

FIG. 3A is an illustration of an example end effect of an example rotary impact separator;

FIG. 3B is an illustration of an example end effect of an example rotary impact separator;

DETAILED DESCRIPTION

Figure 1:
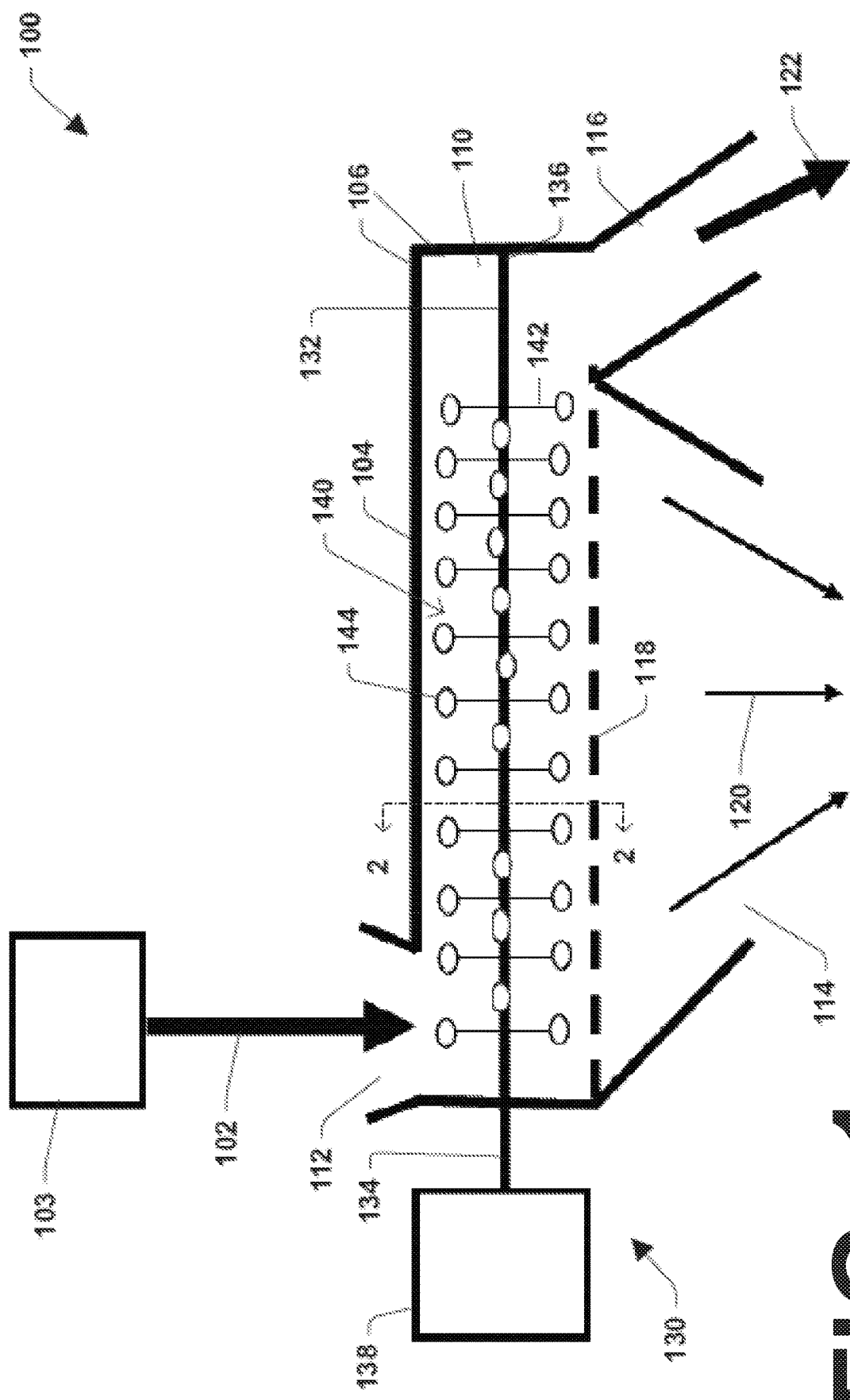
FIG. 1 is an illustration of an example rotary impact separator.

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

In the broadest sense, the application relates to processes that separate a smaller more friable component from a larger less friable component using a rotary impact separator as described herein. In one aspect, the application relates to processes for recovering a cellulose-rich material with a reduced debris content from a mixture of various paper goods and debris. In another aspect the application relates to processes for recovering a plastic-rich stream with reduced dirt and other contaminants from a mixture of plastic and contaminants.

Paper, which includes various pre- and post-consumer papers, cardboards, packaging, and the like can be converted into cellulose fiber through a process called fiberizing. This fiber can be used in cellulose insulation, as an asphalt additive, as a grease thickener, and in various industrial applications. Typically, the material is first shredded to reduce particle size. The material is then often passed through a hammer mill to further reduce particle size. Finally, the material can be passed through a fiberizer to further separate the cellulose fibers, decrease bulk density, and improve insulating properties. These process steps work well on debris-free feedstocks. However, the presence of contaminants such as plastic film, plastic bottles, aluminum cans, plastic book covers and the like cause significant manufacturing problems. Plastic film tends to wrap on rotating elements such as shredder shafts and hammer mill components, requiring frequent cleaning and associated down time. Failure to clean these contaminants in a timely manner can result in unwanted friction and fire. Fiberizer components which include many fine teeth can be easily damaged by such contamination. The contaminants can dull the teeth and/or fill in the groove in between adjacent teeth, impeding their ability to cut and fiberize the cellulose. Finally, large contaminants in the product stream can block blower nozzles, impeding the ability of installers to rapidly and uniformly cover large areas with blown insulation.

It has been determined that by intercepting the cellulose-rich stream at any point in the process and passing intercepting the cellulose-rich stream through a RIS, efficient and economical removal of virtually all the debris having a dimension greater than the screen size in the RIS can be achieved. Consider three points in the manufacturing process: a) after the shredder, b) after the hammer mill, and c) after the fiberizer. As paper moves through the process, the average particle size decreases. Consequently, a smaller and smaller screen size can be used in the RIS, removing smaller and smaller debris from the paper-rich stream. An RIS unit deployed early in the process will remove larger debris and protect all of the downstream equipment, whereas a RIS unit deployed late in the process can remove smaller debris, but is unable to protect any upstream equipment.

In some applications, it may be beneficial to employ two or more RIS units—a unit early in the manufacturing process to remove gross debris and to protect down-stream equipment, and a unit late in the manufacturing process to remove any smaller residual debris.

The RIS unit not only separates debris, but can also reduce the particle size of paper in a manner similar to that of a hammer mill. Because plastic has higher impact strength than paper, plastic may undergo less particle size reduction than Paper. Therefore, paper is can be reduced in average particle size and passes through the RIS screen, while plastic remains above the screen and exits the unit at the end opposite the feed end.

In some applications, the RIS unit can replace a size reduction unit such as a hammer mill or fiberizer, simultaneously reducing Paper particle size and removing debris.

In a related application, it has been discovered that the same equipment, operated in the same fashion, can be used to separate paper labels and paper debris from recycled plastic, such as soda bottles.

Agricultural plastics have had an impact on commercial farming practices. Plastic mulch prevents weed growth throughout the growing season without the use of pesticides. Plastic mulch also prevents water loss through evaporation and increases the quality of the vegetable product by not letting it rest upon the soil during the growing season. Plastic irrigation pipe, tubing, or drip tape delivers water directly to the root zone of growing plants. It minimizes the amount of water required to irrigate a crop, and prevents various molds, smuts, mildews and the like that grows on the damp leaves that result from broadcast irrigation. Plastic silage wrap is used to secure hay and other silage into bundles for easier handling and storage. It helps to prevent infestation and loss of nutrition due to decay. All of these agricultural plastics have some common traits. In addition to providing increased productivity and reduced cost, they all have a limited life (usually one growing season) and must be removed; they all are dirty when removed, and the ultimate fate of most of these plastics is the local landfill. The polymer content is lost forever, and the polymer will not degrade in a landfill for decades or more.

It has been determined that by passing shredded agricultural plastic through an RIS unit, removal of the dirt burden can be achieved, creating a recycled plastic stream that is suitable for industrial and agricultural use. Plastic, having a relatively high impact strength, remains on top of the RIS screen, whereas dirt, having a very low impact strength, shatters into sand-like grains and falls through the MS screen. Plastic product from a single RIS unit may be sufficiently clean for immediate re-use. Alternatively, the product may be subjected to two or more RIS units to even more dirt removal. Finally, for certain applications, it may be useful to wash the RIS plastic product. However, unlike washing the RIS feedstock, the reduced dirt burden on the RIS product plastic product minimizes the amount of water and surfactant chemicals (as well as waste water treatment chemicals and equipment) required. This is especially important in areas where water is in short supply.

In this application, the separation of debris from a paper or polymer stream is accomplished though the following steps using a RIS:

1) Applying sufficient mechanical force to the feedstock to break any bonds between the primary component of the feedstock and the contaminant(s)

2) If necessary, applying sufficient mechanical force to the feedstock to significantly reduce the particle size of either the contaminant or primary component 3) Separating the smaller particles from the larger particles The Rotary Impact Separator (RIS) is shown in FIG. 1. In this unit, rapidly rotating elements attached to a central shaft impact the feed, breaking any bonds between the principal component and the contaminants. The rotating elements then selectively reduce the particle size of the more friable species (principal component or contaminant), and subsequently separate the larger particles from the smaller particles by inducing the smaller particles to pass through the screen. The larger particles are propelled towards the exit end of the unit, and exit there through the exit port. Various dams, baffles, breakers, and adjustable gates can also be used to help control flow and residence time of the feedstock within the unit, optimizing both throughput and fine particle removal.

Referring to FIG. 1, a rotary impact separator 100 (hereinafter "separator") is illustrated. The separator 100 can be used to separate a material. For example, the separator 100 can break a bond between a principal component and a secondary component, create smaller particles from the more friable species, separate larger from smaller particles, etc. It will be appreciated that the separator 100 illustrated in FIG. 1 is merely exemplary and comprises only one of a number of different embodiments. In other examples, the separator 100 may have different sizes, shapes, constructions, configurations, etc.

In the illustrated example, the separator 100 may receive material 102 from a source 103. The material 102 may comprise, for example, recycled paper, contaminated post consumer agricultural film, or any other feedstock that includes a principal component and a secondary component, one of which is smaller and/or more friable than the other. The material 102 can be supplied from a source 103 to the separator 100.

The separator 100 comprises a body 104. The body 104 extends along a body axis and includes one or more walls 106. The walls 106 can be hard faced to limit premature wear for applications that involve abrasive materials. The body 104 can have any number of shapes, such as cylindrical shapes, cubic shapes, or the like. In an example, the body 104 may be substantially hollow, such that the wall 106 can define a chamber 110. The chamber 110 is sized to receive the material 102 from the source 103. In an example, the body 104 can extend substantially parallel to a floor, though, in other examples, may extend substantially perpendicular to the floor. The body 104 may have a length to diameter ratio of at least 1 to 1, and, in some examples, 4 to 1, and, in other examples, 6 to 1 or more. The cross-section of the chamber 110 can be square, rectangular, rounded, combinations thereof, etc. In some examples, the body 104 may have a rectangularly shaped upper section and a semi-circular shaped lower section.

The body 104 can define one or more openings through which the material 102 can enter the chamber 110. For example, the body 104 may have an inlet opening 112. The inlet opening 112 can be positioned in proximity to the source 103. As such, the material 102 can be provided from the source 103 to the chamber 110 through the inlet opening 112. In the illustrated example, the inlet opening 112 is located substantially underneath the source 103, such that the material 102 can fall (e.g., due to the effects of gravity) from the source 103 and through the inlet opening 112. In other examples, the source 103 could be positioned at other locations with respect to the body 104, such as along a side of the body 104, etc. The inlet opening 112 can also receive material pneumatically or from a metering device. While the inlet opening is illustrated as being located at an end of the body 104 adjacent to a motor 138, such a location is not intended to be limiting.

The body 104 can define two or more outlet openings. For example, the body 104 may have a first outlet 114 and a second outlet 116. In the illustrated example, the first outlet 114 and/or the second outlet 116 can be located on an opposing circumferential side from the inlet opening 112 and/or the source 103. For example, the inlet opening 112 and/or the source 103 may be positioned along a top of the body 104 (e.g., at a first location) while the first outlet 114 and/or the second outlet 116 may be positioned along a bottom of the body 104 (e.g., at a second location that is about 180 degrees from the first location).

In an example, co-products 120, 122 of the material 102 can exit the chamber 110 by passing through the first outlet 114 and/or the second outlet 116. In an example, the first outlet 114 and the second outlet 116 may be located at different axial locations along the length of the body 104. For example, the first outlet 114 may be located towards a center of the body 104 and/or in closer proximity to the inlet opening 112 than the second outlet 116. The second outlet 116 may be located towards an end of the body 104 at an opposite end of the body 104 from the inlet opening 112. In this example, the first outlet 114 and the second outlet 116 may be located at an under side of the body 104 opposite from the inlet opening 112 (e.g., which may be located at a top side of the body 104).

In an example, the first outlet 114 and the second outlet 116 can have different sizes. For example, the first outlet 114 can have a larger size (e.g., length, width, etc.) than the second outlet 116. Such a size difference may be provided to accommodate for a difference in amount of material 102 that passes through the first outlet 114 and the second outlet 116.

Focusing upon the first outlet 114, a screen 118 may be disposed within the first outlet 114 and/or covering the first outlet 114. In such an example, the screen 118 can selectively filter a first co-product 120 of the material 102. The screen 118 can be attached to one or more walls 106 of the body 104 adjacent to the first outlet 114. As such, the first co-product 120 can pass through the screen 118 while passing from the chamber 110 and through the first outlet 114. The screen 118 may have one or more holes that define openings through which the first co-product 120 can pass through. The screen 118 can therefore function to filter at least some of the first co-product 120 from the material 102. To increase screening area, it is possible to fit either of the long walls 106 or the top of the unit with screening means. Such an arrangement can be useful if long axis of the unit is located perpendicular to the building floor.

In an example, the screen 118 may comprise a floor of the body 104, such as a floor with one or more holes to allow for small particles to exit. In such an example, the wall or floor may comprise a perforated material or screening means to allow for the small particles to exit. These small particles may exit by a combination of gravitational forces and centrifugal forces. The size, shape, and arrangement of the openings may depend on a particular application. For example, in the removal of sand and dirt from agricultural film, the screen 118 may comprise a punched plate with very fine holes to allow for the removal of the fine granules with a minimal loss of plastic. In another example, for the separation of debris from recycled paper, a larger sized screen opening may optimally be employed with openings sufficiently large to pass the size-reduced paper while retaining the larger debris particles. The screen 118 can be a perforated plate, a woven screen, a slotted screen, or a combination of the above. In an example, a smooth punched plate may allow for faster axial passage of the material 102 through the chamber 104, and increase throughput, while a woven screen may tend to retard flow, decrease throughput, but can also result in more impacts and/or a cleaner separation. In some examples, it may be beneficial to vary the screen 118 type, or the hole size from the inlet to the exit of the chamber 104. Using screens of varying hole sizes can allow for the generation of more than two product streams from a single unit.

In some examples, the screen 118 can be easily removable to allow for facile cleaning and facile servicing of the chamber 104. Finer screens 118 may tend to be thinner than coarser screens 118, since one typically does not want the thickness of the screens 118 to be greater than the diameter hole. Thinner screens 118 may lack mechanical strength, especially when resisting the impact of centrifugally accelerated particles. Consequently, for finer screens 118, it may be useful to use a coarser screening means as a backing to provide mechanical support for the thinner finer screens 118.

It will be appreciated that the screen 118 is not limited to being located within the first outlet 114. Rather, in some examples, the screen 118 can also cover the second outlet 116. As such, the screen 118 can cover both the first outlet 114 and the second outlet 116. In another example, a first screen (e.g., screen 118) can cover the first outlet 114 while a second, different screen can cover the second outlet 116.

The second outlet 116 may be located on the top, side, or bottom of chamber 110. The second co-product 122 of the material 102 can pass through this outlet by gravity, by centrifugal force, or by pneumatic force. The choice of location depends on the material being separated and the location of the inlet of the next unit downstream of the rotary impact separator 100. In a possible example, the second outlet 116 may be formed within an end wall of the body 104, such that the second co-product 122 can exit through the second outlet 116 and through the end wall of the body 104 in a direction that is substantially parallel to the shaft 132.

The second outlet 116 may or may not be covered with a screen. In an example, a second co-product 122 of the material 102 can pass from the chamber 110 and through the second outlet 116. The second co-product 102 may include portions of the material 102 that are not contained as part of the first co-product 120. In some examples, due to the presence of the screen 118 in the first outlet 114, the first co-product 120 may comprise a more fine material than the second co-product 122. As such, the second co-product 122 may comprise a coarser product than the first co-product 120. In these examples, portions of the material 102 that do not pass through the first outlet 114 as part of the first co-product 120 may pass through the second outlet 116 as part of the second co-product 122.

The rotary impact separator 100 may comprise an impact device 130 for separating the material 102 into the first co-product 120 and the second co-product 122. The impact device 130 may be positioned at least partially within the chamber 110 of the body 104. As such, the impact device 130 can contact, impact, etc. the material 102 when the material 102 is located within the chamber 110.

The impact device 130 comprises a shaft 132. The shaft 132 can extend between a first end 134 and a second end 136. The first end 134 of the shaft 132 may be positioned at an exterior side of the body 104. The second end 136 may be positioned at an interior of the body 104 within the chamber 110. The shaft 132 can extend substantially linearly between the first end 134 and the second end 136. In an example, the shaft 132 can be formed of a substantially rigid and/or non-flexible material that is limited from inadvertent bending, flexing, fracture, etc. The shaft 132 may comprise any number of materials, including metal materials, non-metal materials, plastic materials, composites, etc.

The first end 134 of the shaft 132 may be coupled to a device that can impart movement to the shaft 132. In an example, the first end 134 may be coupled to a motor 138. It will be appreciated that the motor 138 may include any number of movement imparting structures. For example, the motor 138 may comprise gears, drives, sheaves, belts, DC motors, AC motors, asynchronous motors, synchronous motors, etc. In these examples, the motor 138 can cause the shaft 132 to rotate. A user can set and/or adjust the motor 138 to control movement of the shaft 132. For example, the user can set and/or adjust the motor 138 output speed so as to control the rotational speed of the shaft 132.

The impact device 130 may comprise one or more effect structures 140 coupled to the shaft 132. In an example, the effect structures 140 are provided to contact the material 102 within the chamber 110. By contacting the material 102, the effect structures 140 can more effectively disassemble the material 102 and separate the material 102 into the first co-product 120 and the second co-product 122. In addition, since the effect structures 140 are coupled to the shaft 132, the effect structures 140 can be rotated due to the rotation of the shaft 132.

The effect structures 140 may comprise an attachment shaft 142 and an end effect 144. The attachment shaft 142 may be coupled to the shaft 132. In some examples, the attachment shaft 142 may be substantially perpendicular with respect to the shaft 132. In other examples, the attachment shaft 142 may be angled with respect to the shaft 132, such as by forming an angle that is between about 10 degrees to about 80 degrees with respect to the shaft 132. The attachment shaft 142 can be formed of a substantially rigid and/or non-flexible material that is limited from inadvertent bending, flexing, fracture, etc. The attachment shaft 142 may comprise any number of materials, including metal materials, non-metal materials, plastic materials, composites, etc. The attachment shaft 142 can extend a distance from the shaft 132 towards the walls 106 of the body 104.

One or more end effects 144 can be coupled to the attachment shaft 142. In an example, the end effects 144 can be coupled to an end of the attachment shaft 142 that is opposite the shaft 132. The end effects 144 may be provided so as to contact the material 102 when the shaft 132 is rotated. The contact of the material 102 by the end effects 144 can cause the material 102 to separate into the first co-product 120, the second co-product 122, etc. For example, the end effects 144 may be rotated as a result of the rotation of the shaft 132 and resulting rotation of the attachment shaft 142. This movement of the end effects 144 can cause contact between the material 102 and the end effects 144. To improve balance, end effects 144 may be installed in pairs, one on each side of the shaft 132. The end effects 144 in a pair can be the same or nearly the same weight.

A flow of the material 102 through the chamber 110 may be controlled by a combination of gravity and angled end effects 144 such as paddles. In the absence of any angled end effects 144, flow through the chamber 110 can be achieved by angling the chamber 110 relative to the floor so that the inlet end is higher than the exit end. Thus with each turn of the shaft 132, the fluffed material 102 may fall slightly downfield from its previous position. Angled end effects 144 such as paddles and claws move material downfield through a combination of direct action on the feed material and by creating an axial air movement that helps to lift and carry particles downfield. Depending on the rotational speed and the desired residence time, a combination of tilting and paddles can be used to move material through the chamber 110.

Alternatively, one can use slightly opposing forces to retard excessively fast axial movement. For example, one could set paddles to push material downfield, and then elevate the exit end of the chamber 110 to slightly retard that motion. Changing the angle of the chamber 110 can provide an easy means of on-line control of the residence time.

FIGS. 2A to 2D illustrate examples of the rotary impact separator 100 as viewed from the perspective indicated by lines 2-2 in FIG. 1. As illustrated, other example methods of controlling flow through the chamber 110 may include the use of static or mobile baffles 202. In an example, one or more baffles 202 may be inserted at right angles to the long dimension of the chamber 110 and at right angles to the shaft 132. These baffles can be inserted from the "floor", "ceiling" or "side walls" of the chamber 110 to various depths. The more intrusive the baffle, the more it will retard motion through the chamber 110, and the more it will increase residence time. Baffles can be used singly or in pairs. For example, one might have one baffle extending down from the "ceiling" and another extending upward from the "floor" with a small opening in between the two baffles to allow flow. In the limiting case, one can divide a long chamber 110 into a series of smaller sub-chambers, each with its own screen 118 and end effects 144. For the processing of paper or agricultural mulch, it is useful to have a number of baffles to help promote plug flow and prevent by-passing of the rotating implements by the feed.

The speed of revolution of the shaft 132 is another controllable and beneficial parameter. Higher rotational rates increase the speed of the end effect 144, and increase the amount of energy transferred to the feedstock. For some applications, such as removal of a strongly adhering dirt, a high rate of speed may be provided to break the bonds between the dirt and the substrate. For some applications such as the replacement of a hammer mill in a cellulose processing line, a high rate of speed may be provided to substantially reduce the average particle size of the paper particles. For other applications, such as sorting and screening, a lower rotational rate is optimum to allow time for smaller particles to pass through the screen 118 before getting hit by the next paddle. For some applications, such as the removal of debris from a paper-rich stream that has already been properly sized and further size reduction is not beneficial, a slower rate of speed may be provided. In general, the separator 100 is operated at end effect tip speeds that are higher than those normally found in a centrifugal sifter, but lower than those found in a hammer mill. It can be useful to have several separator 100 units in series, each operating at a different rotational rate to achieve different goals, for example: Bond breaking/size reduction of one species/separation.

Figure 2B:
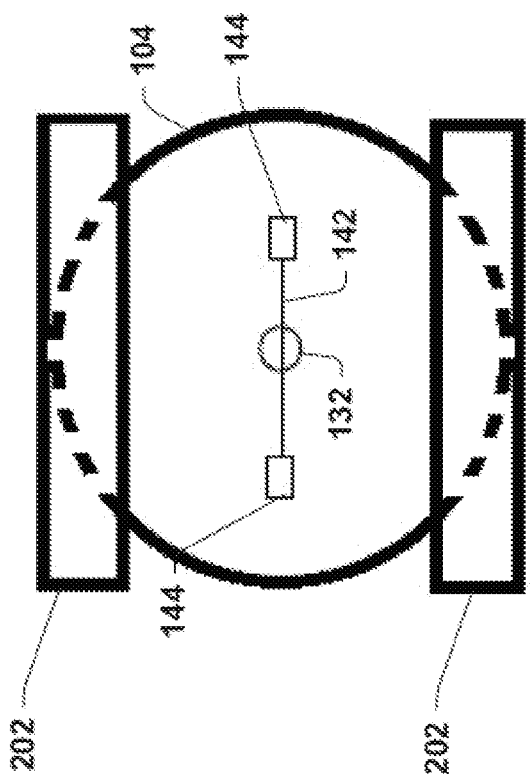
FIG. 2B is an illustration of a portion of an example rotary impact separator.
Figure 2A:
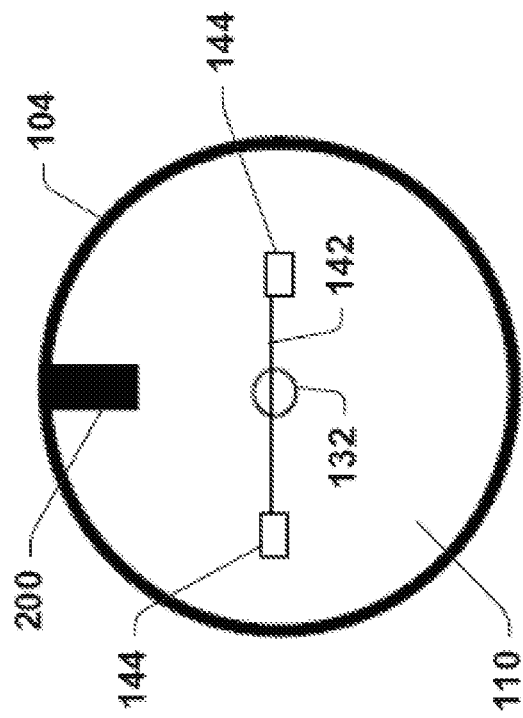
FIG. 2A is an illustration of a portion of an example rotary impact separator.

To limit feedstock materials 102 from simply rotating with the end effects 144 on the shaft 132, breakers 200 (e.g., as illustrated in FIGS. 2A and 2D) or other disruption points can be added. In an example, the breakers 200 may be attached to the body 104 (e.g., to an interior surface of the wall 106). The breakers 200 can project from the body 104 towards the shaft 132 so as to define a reduced diameter within the chamber 110.

The breakers 200 may be attached to the long walls or "ceiling" of the chamber 110 and typically run parallel to the long dimension of the chamber 110, and parallel to the shaft 132. They protrude from the wall or ceiling to disrupt cyclonic flow of material around the central shaft, causing more interaction with the feedstock material and the end effects 144. The breaker 200 can be a single bar or a series of parallel bars. In some cases, the breakers 200 may comprise a piece of screening material attached to the wall, or one or more lines of raised welding on the inner wall. The breakers 200 can be static or adjustable. The breakers 200 will usually be the point of least gap between a stationary point and the end of an end effect. In a possible example, the breakers 200 may be attached to the screen 118. In some examples, differently sized and/or shaped breakers 200 may be provided in different sections of the chamber 110.

The breakers 200 can also be one or more rods or metal strips attached to the long wall and inserted a short distance radially into the lumen of the processing chamber. In this case, if the breakers 200 are located axially in between the end effects, they can actually extend into the chamber so that the end of the breaker 200 is actually closer to the central shaft 132 than the tip of the end effect 144. Such an arrangement can cause severe turbulence in the flow pattern, and helps strip contaminants from a substrate.

The inlet opening 112 may be internally baffled to prevent premature ejection of the incoming feedstock. This can take the form of a "zig zag" structure or simply an angled chute with internal baffling.

It will be appreciated that the screen 118 illustrated in FIG. 2D has a rounded, non-planar shape. Indeed, in some examples, the screen 118 may have a flat, substantially planar shape while in other examples (e.g., FIG. 2D), the screen 118 may have a rounded, semicircular shape. In either of these examples, the screen 118 can function to limit the type and/or amount of material that passes through perforations in the screen 118.

The outlet (e.g., the second outlet 116) can be large enough to accommodate the volume of material produced. In the case of recycled paper, the bulk density of the product stream is significantly lower than that of the feedstock stream, since the paper has been fiberized in the process. If the inlet opening 112 is too small, it will create a pinch point and cause the feedstock material to back up in the unit, rather than flow freely. It can be useful to mount a pair of paddles attached to the central shaft in the area of the exit chute to assist in moving the product material out of the chute. The outlet may be located at a variety of places near the end of the separator opposite the feed end, including the "floor", "ceiling", and "sides".

For the recycling of paper in the separator 100, then, rapidly rotating elements attached to the shaft 132 impact the feed, preferentially reducing the size of the paper particles and driving them through Screen 118. Contaminants such as plastic and aluminum suffer less size reduction and remain above the screen, exiting through a different opening than the paper, i.e. Exit 116. The rotating elements can have the appearance of paddles, chains, knives, or other shapes. Various dams, baffles, and adjustable gates can also be used to help control flow and residence time of the fiber within the unit, optimizing both throughput and product removal.

For the recycling of agricultural plastic in the separator 100, then, rapidly rotating elements attached to the shaft 132 impact the feed, preferentially reducing the size of the dirt particles and driving them through screen 118. The plastic portion of the feedstock suffers less size reduction and remain above the screen, exiting through a different opening than the dirt, i.e. Exit 116. The rotating elements can have the appearance of paddles, chains, knives, or other shapes. Various dams, baffles, and adjustable gates can also be used to help control flow and residence time of the fiber within the unit, optimizing both throughput and product removal.

By optimizing the rotational speed of the unit, the type and location of rotating elements, the distance between the breakers and the rotating elements in the separator 100, and the position of the baffles and dams, one can maximize the separation of contaminants from the primary component while minimizing size reduction of the less friable species. Especially for recycled paper, fiber length is critical, and long fibers are highly preferred over short fibers.

A Rotary Impact Separator is different from a traditional hammer mill in a number of ways. First, a hammer mill has only one inlet and one outlet for solids. All of the feed material to a hammer mill must be sufficiently reduced in size to pass through the screen in the hammer mill and report to the product stream. In contrast, the Rotary Impact Separator has one inlet and two or more outlet means (the exit chute 116 and through the screen(s) 118). All of the feed to the Rotary Impact Separator does not have to be reduced in size to pass through the screening means. Rather, finer particles can pass through the screen while larger particles can move axially along the screen and exit the device through the alternate exit port.

Secondly, a Rotary Impact Separator uses a variety of elements as the impact means, whereas the hammer mill uses either rigid or hinged solid hammers. The elements or end effects in a rotary impact separator can include variously shaped paddles, claws, knives, chains, hammers, and flails. Each of these end effects is best for a particular function.

Thirdly, the hammer mill spins much faster and provides much more impact energy to feed particles than the rotary impact separator. This can tend to cut or tear fibers or plastics. The more gentle impact of the Rotary Impact Separator, coupled with appropriate end effects, achieves the necessary size reduction of the more friable species while minimizing size reduction of the less friable species. A Rotary Impact Separator operates at tip speeds significantly lower than traditional hammer mills. Hammer mills such as those sold by Schutte Buffalo typically have tip speeds in the range of up to 400 feet per second (approximately 120 meters per second), whereas the Rotary Impact Separator typically has tip speeds in the range of up to 120 feet per second (approximately 35 meters per second). Since energy transferred from the mill to the substrate is a function of the square of the tip speed, the difference is even more dramatic. Excessive energy input, such as that found in a hammer mill, can result in unwanted fiber shortening.

In a hammer mill, the bulk flow of material is largely perpendicular to the rotating axis, whereas in the rotary impact separator, the bulk flow of material is largely parallel to the rotating axis. In a hammer mill, since the bulk flow is largely perpendicular to the rotating axis, an incoming particle of feed effectively interacts with essentially 1 pair of hammers as it falls from the feed chute to the screen. In the rotary impact separator, since the bulk flow of material is parallel to the rotating axis, an incoming particle of feed is forced to interact with substantially all of the end effects as the particle moves from the inlet end to the outlet end of the processing chamber. Furthermore, in a hammer mill, a feed particle can only interact with a single type of end effect (i.e. the hammer), whereas in a rotary impact separator, a feed particle can interact sequentially with a broad range of end effects (paddles, claws, knives, flails, hammers, etc.). The screen 118 in a hammer mill may contain a single size opening and produce a single product. However, in the rotary impact separator, one can use a sequence of screens of varying sizes and produce two or more co-products from a single unit.

A rotary impact separator is also different from a conventional centrifugal screener. A centrifugal screener operates at relatively low rpm compared to a rotary impact separator. At these low tip speeds, the centrifugal screener lacks the energy to significantly reduce the particle size of the more friable component of the feed. The only function of a centrifugal screener is to separate previously-created small particles from larger particles. In contrast, the rotary impact separator, by virtue of its unique set of rotating implements and its higher rotational speed, can simultaneously create smaller particles from the more friable component of the feed, and simultaneously separate those smaller particles from the less friable portion of the feed.

A centrifugal screener is often used in processes where most of the feed material goes through the screen. This type of operation is often referred to as "scalping"—the removal of a small amount of larger-sized contaminants from the bulk of feed. One example is the removal of small stones from flour. The bulk of the feed (the flour) goes through the screening means while the larger-sized contaminants (the stones) are retained on the screen. In contrast, the rotary impact separator can be used in scalping operations or operations in which the bulk of the feed does not go through the screen. In the case of agricultural plastic, for example, the volume of dirt removed is less than 10% of the volume of the cleaned plastic flake.

In a centrifugal screener, the volume of material inside the unit tends to decease as the feed moves from the inlet end to the exit end. This decrease is due to the removal of a significant portion of the feed through the screen means. However, in the Rotary Impact Separator, it is possible for the volume of material inside the unit to increase as the feed moves from the inlet to the exit end. This is particularly true in the case of paper recycling wherein the beating and sifting action tends to reduce the bulk density of the material inside the unit, increasing its volume.

Rotary impact separators can also be combined with other types of impact and separation equipment described above, including hammer mills and other attrition devices, various types of screeners, and various types of elutriators.

Referring to FIGS. 3A to 3F, possible examples of the end effects 144 are illustrated. It will be appreciated that the end effects 144 illustrated in FIGS. 3A to 3F are not intended to be limiting, as other possible types of end effects 144 are envisioned. Indeed, variations with respect to the illustrated end effects 144 size, structure, construction, configuration, etc. are contemplated. In the illustrated examples, the possible end effects 144 include a paddle (e.g., FIG. 3A), a claw (e.g., FIG. 3B), a knife (e.g., FIG. 3C), a chain (e.g., FIG. 3D), a hammer (e.g., FIG. 3E), a flail (e.g., FIG. 3F), etc.

Referring to FIG. 3A, the end effects 144 may include any number of materials. In a possible example, one or more of the end effects 144 may include paddles 300. The paddles 300 may include quadrilateral (e.g., square or rectangular) pieces of flat plate that are mounted to the attachment shaft 142 which may be perpendicular to the shaft 132. The flat dimension of the paddles 300 can be oriented substantially parallel to the shaft 132 or, in some examples, can be twisted at an angle with respect to the shaft 132. Paddles 300 that are twisted in one direction can tend to advance the material 102 down the length of the body 104 from the inlet opening 112 towards the outlet openings 114, 116. Paddles 300 in this orientation are useful near the inlet opening 112 of the body 104 to help move the material 102 towards the outlets 114, 116. Paddles 300 twisted in the opposite direction will tend to retard and/or inhibit movement of the material 102 through the chamber 110. Paddles 300 in this orientation are useful to increase the residence time of the material 102, especially in the sections of the chamber 110 near the middle. Paddles 300 near the exit end of the chamber 103 can help to eject the material 102 from the chamber 110, driving the material 102 towards the outlets 114, 116.

The strength of the flat plate from which the paddle 300 is made may be less than the strength of the attachment shaft 142 onto which the paddle 300 is mounted. In an example of a rigid contaminant in the chamber 110, it may be beneficial for the paddle 300 to bend rather than allowing for the attachment shaft 142 to break. In some examples, the paddles 300 can be removed from the attachment shaft 142 for facile servicing, cleaning, replacement, etc.

Referring to FIG. 3B, one or more of the end effects 144 may include claws 302. While the paddle may have a flat top edge, the claw may have a claw body 304 (e.g., which may be similar in structure to the paddle 300) with a serrated top edge portion 306 attached to the claw body 304. The claws 302 can be useful for tearing larger pieces of the material 102 (e.g., feed). In some examples, the claws 302 are beneficial for reducing the particle size of paper feed, and for opening up clumps of cellulose fiber for processing. The serrated edge 306 can be cut directly into the paddle material, or it may be a separate piece that is attached to the paddle. In an example, the serrated edge 306 may be made of the same material as the paddle, or it can be made of a hardened material to maintain sharpness and resist abrasion. In an example, a smaller number of large teeth tend to be more useful for the opening up of clumps of fiber. Multiple types and sizes of paddles and claws can be employed in the same machine.

Figure 3D:
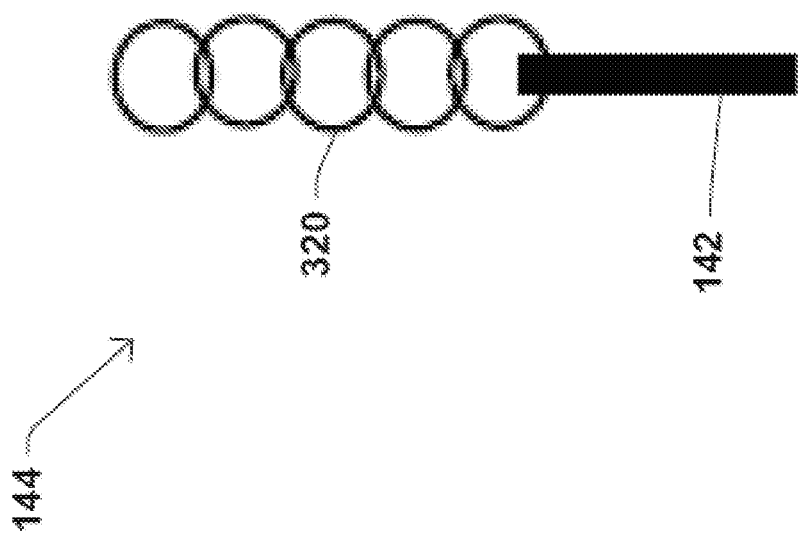
FIG. 3D is an illustration of an example end effect of an example rotary impact separator.
Figure 3C:
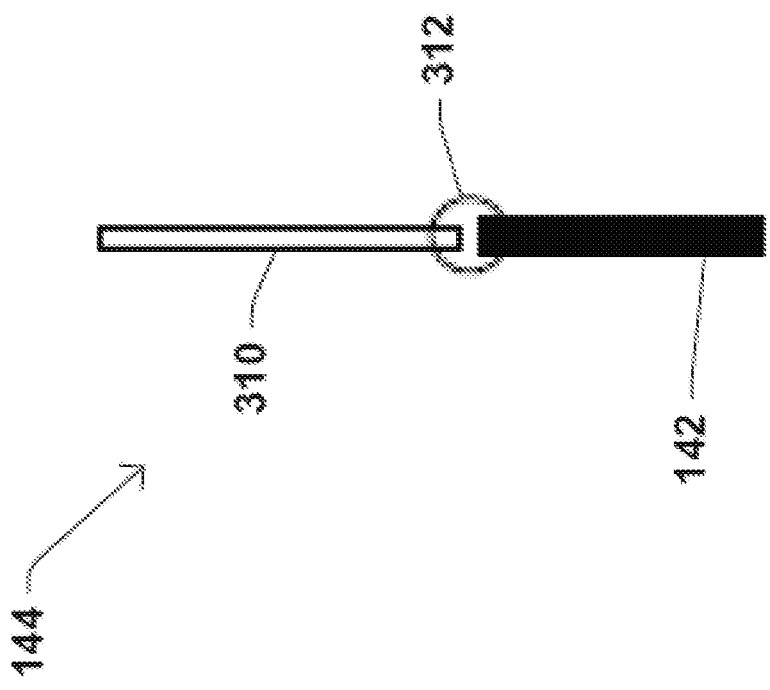
FIG. 3C is an illustration of an example end effect of an example rotary impact separator.

Referring to FIG. 3C, one or more of the end effects 144 may include knives 312. The knives 312 may include pieces of substantially flat material with a length to width ratio of at least two to one. The blade may be mounted to the attachment shaft 142, such as with the knife blade being installed with the thinnest dimension perpendicular to the shaft 142. In an example, the knife 310 may be allowed to pivot with respect to the shaft (e.g., 132 or 142). In such an example, a pivot structure 312 can be provided for attaching the knife 310 to the shaft (e.g., 132 or 142). This pivot structure 312 can allow for the knife 310 to fold back in the event of encountering a rigid contaminant in the material 102, thus avoiding damage to the knife 310. Under normal operating conditions, centrifugal force from the shaft 132 or 142 can keep the knife blade extended radially from the shaft 132 or 142. Alternatively, the knife may be rigidly attached to the attachment shaft 132 or 142 and not allowed to pivot. The narrow edge of the knife blade may impact the material 102 with force, since the impact energy may be concentrated into a small area. This may be useful for the removal of residual adhesive and dirt from fibers.

Referring to FIG. 3D, in an example, one or more of the end effects 144 may include chains 320. The chains 320 may be comprised of a connected flexible series of metal links. The chains 320 may be attached to the attachment shaft 142 that extends at right angles to the shaft 132. In an example, while a chain 320 can move in all directions, under normal operating conditions, centrifugal force can cause the chain 320 to extend radially outwardly from the shaft 132. Because of the flexibility of the metal links, the links may be less likely to suffer damage upon encountering a rigid contaminant within the material 102. This property can make chains 320 useful for the initial breakup of rigid feedstock materials. The chains 320 may also be useful for the sorting (e.g., shape sorting) of components in the feed, as the chains 320 drag the material 102 across the screen.

Figure 3F:
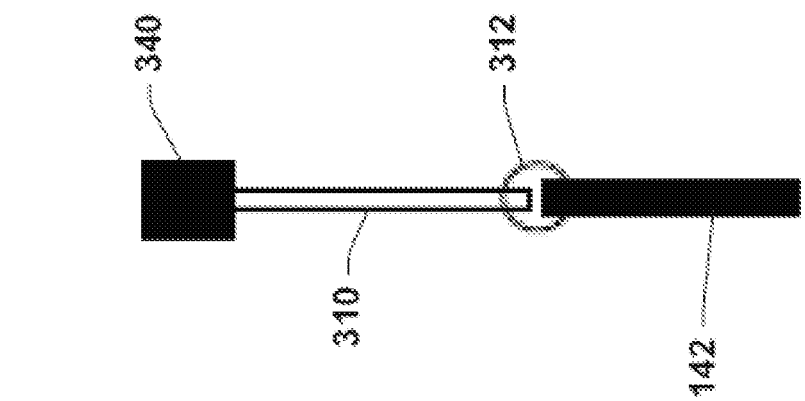
FIG. 3F is an illustration of an example end effect of an example rotary impact separator.
Figure 3E:
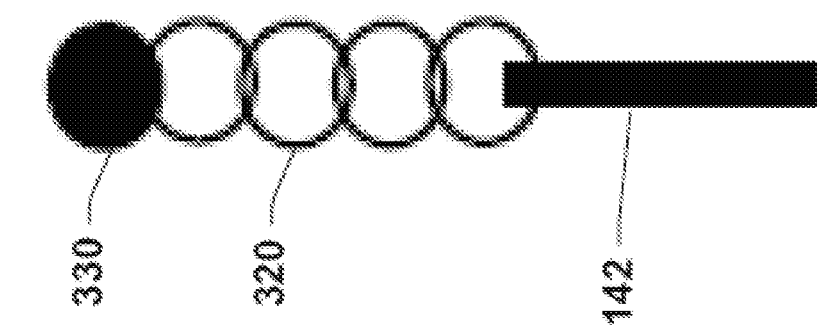
FIG. 3E is an illustration of an example end effect of an example rotary impact separator.

Referring to FIG. 3E, in yet another example, one or more of the end effects 144 may include hammers 330. The hammers 330 may be created by adding a heavy piece of metal to the end of the chain 320. Since the end of the chain 320 may move at a maximum velocity, this hammer head 330 may impact the feed material with great force and momentum, thus helping to disassemble the feedstock materials, and to remove adhering contaminants from the desirable particles and fibers. It may be especially useful in the breaking up of plastics, and in the crushing of friable materials into easily removable fine granules.

Referring to FIG. 3F, in an example, one or more of the end effects 144 may include flails 340. Flails 340 may be created by adding a heavy piece of metal to the end of a knife 310. Since the end of the knife 310 may move at the maximum velocity, this weighted piece may impact the material 102 with great force and momentum, thus helping to disassemble material 102, and to remove adhering contaminants from desirable particles and fibers. It may be especially useful in the breaking up of plastics, and in the crushing of friable materials into easily removable fine granules.

The spacing between the walls 106 of the body 104 and the ends of the end effects 144 may be designed to allow for the material 102 to pass through the chamber 110. For example, if the spacing is too tight, then the material 102 can jam between the end effects 144 and the walls 106, causing the motor 138 to over-amp. If the spacing is too large, then the material can stagnate and accumulate, thus disrupting pseudo plug flow through the chamber 110. The wall to end effect spacing may not be constant throughout the chamber 110. It may be useful to have a larger spacing near the inlet end of the chamber 110 (e.g., where the feed particles are larger) and a smaller spacing near the exit end of the chamber 110 (e.g., where the particles are smaller).

As described and illustrated herein, a number of processes for processing materials containing at lease one more friable and one less friable component, and recovering the resulting product are provided. At least some of these processes are illustrated with respect to process flow diagrams. It will be appreciated that the process flow diagrams are not intended to be limiting, but are merely examples of possible processes for recovering a resulting product from carpet, turf, etc. Indeed, in some examples, the process flow diagrams may include extra steps that may not be illustrated, or may not include each of the steps that are illustrated in the figures and described herein.

It may be beneficial to remove a significant amount of the contaminant from the final product to maximize the value of the recovered material. Preferably at least 50% or more preferably at least 75% or more preferably at least 90% of contaminant is removed from the recovered material. It may be useful to use a series RIS units to further improve the quality of the end product.

Recovered clean plastics from agricultural plastic feedstocks are useful for a number of industrial, domestic, and agricultural products. The polymer can be extruded into strands or pellets or sheets and used in the manufacture of a wide variety of products, including the manufacture of new plastic ground cover and irrigation tubing.

Recovered clean paper is useful for a number of industrial, domestic, and agricultural products as well. The cellulose fiber can be used in the manufacture of new paper or cardboard, fiberized to product cellulose-based insulation, be used as a strength enhancement in asphalt, used as a binder in pelletizing applications, or as a thickener in various liquid and paste products.

It should be noted that in the recycling of paper, a rotary impact separator tends to remove contaminants with less fiber damage than higher impact means such as a hammer mill.

As used herein, the term "paper" is intended to be interpreted broadly to describe news paper, office paper, wrapping paper, post consumer paper, "mixed" paper, cardboard, corrugated cardboard, packaging materials, and the like.

As used herein, the term "agricultural plastics" is intended to be interpreted broadly to describe any polymeric material used in any application which is contaminated with some type of dirt or foreign material.

Thus, in one aspect, the application relates to processes for generating a clean cellulose-rich stream from a contaminated feed paper stream by passing the feed stream through a RIS, the process comprising: a) applying mechanical force to the feed stream to preferentially reduce the particle size of the paper relative to the particle size of the contaminants, and b) mechanically separating the smaller paper particles from the larger contaminant particles.

In another aspect, the application relates to processes for recovering clean plastic from a feed stream containing plastic and a contaminant such as dirt. The process comprises: a) applying mechanical force to feed to break the bond between the plastic and the contaminant, b) mechanically separating the larger plastic particles from the smaller dirt particles. The recovered plastic may be extruded to form an article, or may be injection-molded to form an article, or compressed to form an article.

The application further comprises the cellulose fiber material recovered according to the processes of the application. The application further comprises the polymeric material recovered according to the process of this application. This polymer may be extruded or injection molded or compressed to form an article.

In one aspect, the feed to the processes according to the application may be provided as pieces cut or shredded to a size suitable for easy handling. Feed pieces suitable for this process can range in maximum size from as small as 1 cm square to as large as 30 cm square. This cutting or shredding can occur in any type of commercial guillotine or shredder or granulator. The optimum size is a function of the specific requirements of the mechanical disassembly device and the desired product specification.

According to the application, after preparatory size reduction, any ferrous contamination may be removed, for example, by magnetic separation. Fines and incidental dirt may likewise be optionally removed at this time. Fines include small pieces of both the principal component and the contaminant. The more intense the size reduction process, the greater the generation of fines. In general, fines represent a loss of potentially good product and should be minimized.

The products from the RIS may thereafter optionally be further washed, cleaned, or otherwise processed to further reduce attached and loose contaminants using techniques known to those skilled in the art. A float/sink separation or a froth flotation separation may be useful for some products.

To further elaborate, in an example, the process may be carried out by size-reducing the feedstock to a size suitable for easy handling using one or more guillotines, shredders or granulators. The shredding may be carried out in a variety of manners, for example using a twin-shaft shredder such as those made by SSI or Shred Tech, or a single-shaft shredder such as those made by Linder or Komptech or a granulator such as those made by Cumberland or Rapid, or guillotine-type device such as those made by Pirette in France.

The shred top size may, if desired, be less than 100 cm square, or less than 10 cm square, or less than 1 centimeter square. Any ferrous contamination may be removed, for example, by magnetic separation of nails, staples, other ferrous contaminants, and the like. Non-ferrous metallic contaminants can be removed, for example, by eddy current machines. Fines and incidental dirt and sand may optionally be removed at this point, if desired, using screening, aspiration, or any other suitable means to remove fines from the shredded material. As will be readily appreciated from the foregoing, advantages of the application include higher recovery of the principle component, improved quality of the principle component, reduced manpower and improved economics.

While this application has been described in terms of paper and agricultural plastic recycling, it is apparent that the rotary impact separator process can also be applied to different feedstocks to separate dirt and contaminants from valuable materials. Feedstocks include but are not limited to: a) dirty polymer flake, wherein the process separates the dirt, residual label, and residual adhesive from the polymer flake; b) contaminated shipping containers including "big bags" or "super sacks" and smaller packaging, wherein the process disassembles the container and separates the dirt and residual contained materials from the polymeric sacking fibers; c) contaminated natural fibers such as hemp, cotton or jute, wherein the process separates dirt, clay, sticks, stones, etc. from the fiber; d) mixed textiles, wherein the process separates dirt and fasteners (buttons, zippers, hooks, eyes, and the like) from the fiber components, creating a shoddy material useful in various industrial applications; e) various agricultural products wherein the process separates dirt and unwanted plant parts from desired components, including grains, nuts, and seeds.

In each case, mechanical force is applied to disassemble any aggregates found in the feedstock, mechanical force is applied to break the bond between the contaminants and the desired components, and the contaminants are separated from the desired components. In some examples, some or all of these cleaning operations are carried out in the absence of any added water or chemicals. However, in some possible examples, these cleaning operations may be carried out with added water and/or chemicals. For example, one or more chemicals, such as a fire retardant, a deodorant, biocide, sanitizer, etc. may be added, which allows the rotary impact separator to additionally function as both a mixer and a contactor.

Figure 4A:
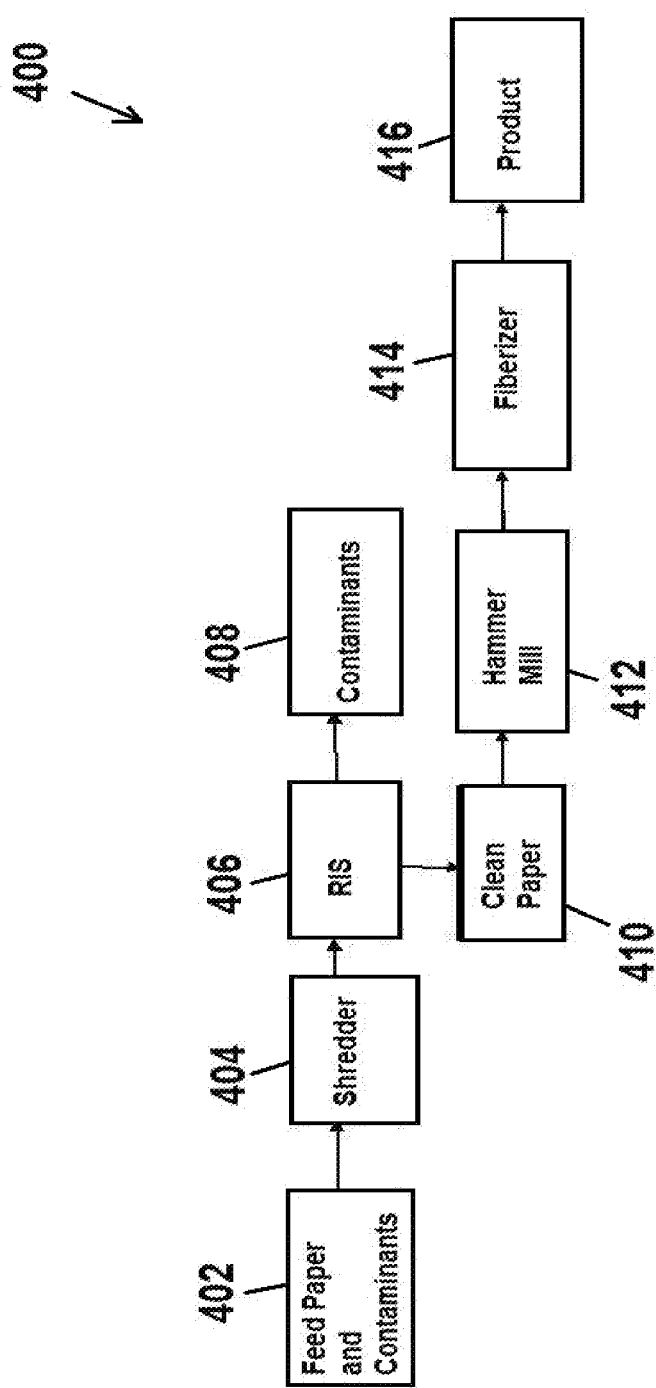
FIG. 4A is an illustration of an example method of recycling a material.

Referring to FIG. 4A, a method 400 for recovering two or more product streams from a feedstock 402 is illustrated. In some embodiments, the feedstock 402 comprises paper and contaminants. For example, the feedstock 402 may comprise a polymeric material. In other embodiments, the feedstock 402 may comprise a post-consumer polymeric material that was previously used in agriculture. In some embodiments, the feedstock 402 comprises a post-industrial or post-consumer plastic, or a mixture thereof. In some embodiments, the feedstock 402 comprises a polymer-rich stream that may be derived from a municipal recycling facility (MRF). In some embodiments, the feedstock 402 comprises a cellulose-rich stream. In some embodiments, the feedstock 402 may comprise a stream derived from paper, newsprint, books, and magazines. In some embodiments, the feedstock 402 may comprise a stream derived from cardboard, corrugated cardboard, and packaging materials. In some embodiments, the feedstock 402 may comprise a stream derived from recycled paper, mixed paper, recycled cardboard, and mixtures thereof. In some embodiments, the feedstock 402 may comprise a cellulose-rich stream which has been partially or fully processed into cellulose-rich insulation. In some embodiments, the feedstock 402 may comprise a cellulose-rich stream derived from a municipal recycling facility (MRF). In some or all of the aforementioned embodiments, the feedstock 402 may comprise a plurality of components. For example, the method 400 may comprise receiving the feedstock 402 comprise a principal component and at least one secondary component, where a friability of the principal component is different than the friability of the at least one secondary component. For example, a friability of the principal component may be greater than a friability of the at least one secondary component, though, in other embodiments, the friability of the principal component may be less than the friability of the at least one secondary component.

In some embodiments, the method 400 can comprise passing the feedstock 402 to a first impacting station 404 to at least partially separate the feedstock into a separated feedstock. For example, the first impacting station 404 may comprise a shredder that can shred the feedstock 402 into the separated feedstock. The shredder can at least partially reduce the feedstock 402 into the principal component and the at least one secondary component, such as by at least partially separating the principal component from the at least one secondary component.

In some embodiments, the method 400 can comprise passing the separated feedstock from the first impacting station 404 through a second impacting station 406 to at least partially separate a principal component stream from the separated feedback. For example, in some embodiments, the principal component stream may comprise clean paper 410. In some embodiments, the at least one secondary component may comprise contaminants 408. The principal component stream (e.g., which may comprise clean paper 410) can then be passed to a third impacting station 412, such as a hammer mill, for example. The hammer mill can impact the clean paper 410, whereupon the hammer mill 412 delivers the resulting product to a fiberizer 414. After the fiberizer, the method 400 can comprise collecting a principal component stream (e.g., a product 416) with reduced levels of the at least one secondary component (e.g., the contaminants 408).

Figure 4B:
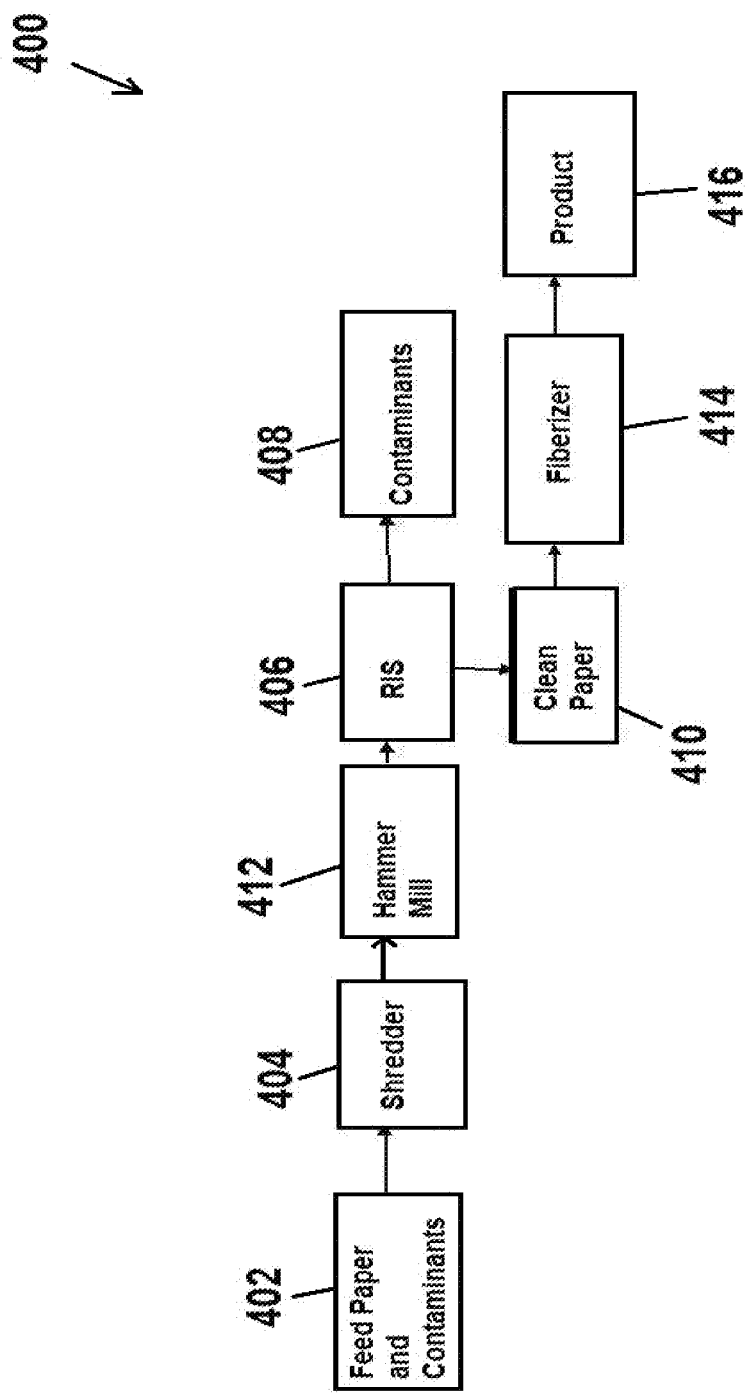
FIG. 4B is an illustration of an example method of recycling a material.

Referring to FIG. 4B, another example of the method 400 for recovering two or more product streams from the feedstock 402 is illustrated. In some embodiments, the hammer mill 412 can be located between the shredder 404 and the rotary impact separator 406. In these embodiments, the shredder 404 can shred the feedstock 402 and deliver the shredded feedstock 402 to the hammer mill 412. The hammer mill 412 can impact the shredded feedstock 402, and deliver the resulting product to the rotary impact separator 406. Following the product passing through the rotary impact separator 406, the principal component stream can be collected with reduced levels of the at least one secondary component. For example, the product 416 can be collected, which is at least partially separated from the contaminants 408.

Figure 4C:
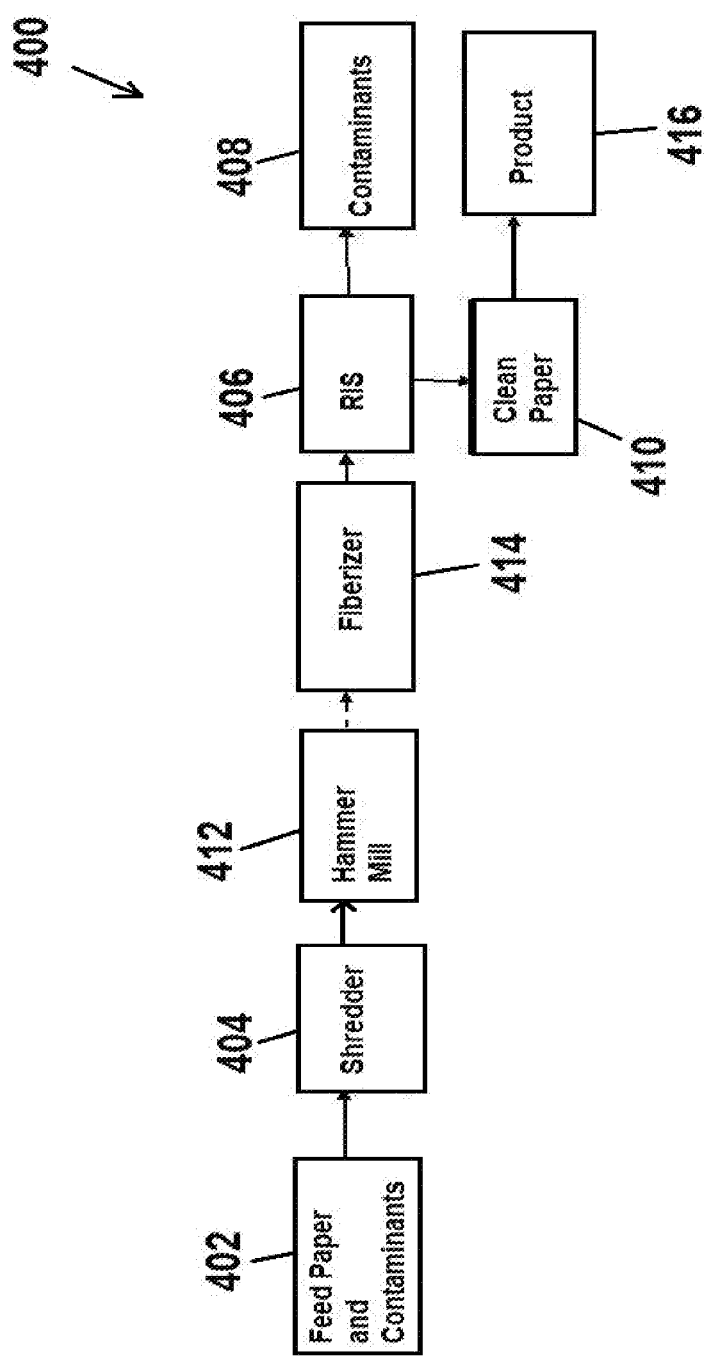
FIG. 4C is an illustration of an example method of recycling a material.
Figure 4D:
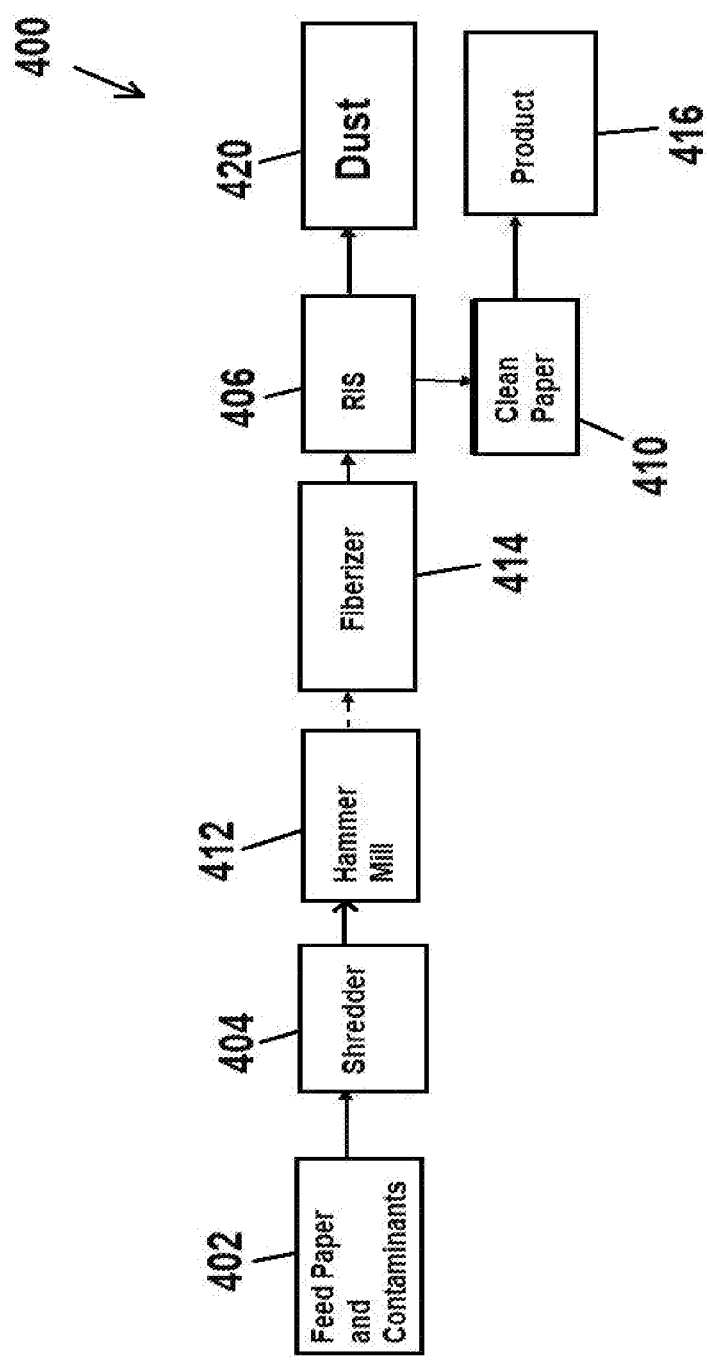
FIG. 4D is an illustration of an example method of recycling a material.

Referring to FIG. 4C, another example of the method 400 for recovering two or more product streams from the feedstock 402 is illustrated. In some embodiments, the fiberizer 414 can be located between the hammer mill 412 and the rotary impact separator 406. In these embodiments, the hammer mill 412 can impact the shredded feedstock 402, and deliver the resulting product to the fiberizer 414. The fiberizer 414 can fiberize the product and deliver the resulting product to the rotary impact separator 406. Following the product passing through the rotary impact separator 406, the principal component stream can be collected with reduced levels of the at least one secondary component. For example, the product 416 can be collected, which is at least partially separated from the contaminants 408. Referring to FIG. 4D, another example of the method 400 for recovering two or more product streams from the feedstock 402 is illustrated. In some embodiments, following the product passing through the rotary impact separator 406, principal component stream can be collected with reduced levels of the at least one secondary component. For example, the product 416 can be collected, which is at least partially separated from a dust 420.

Figure 5:
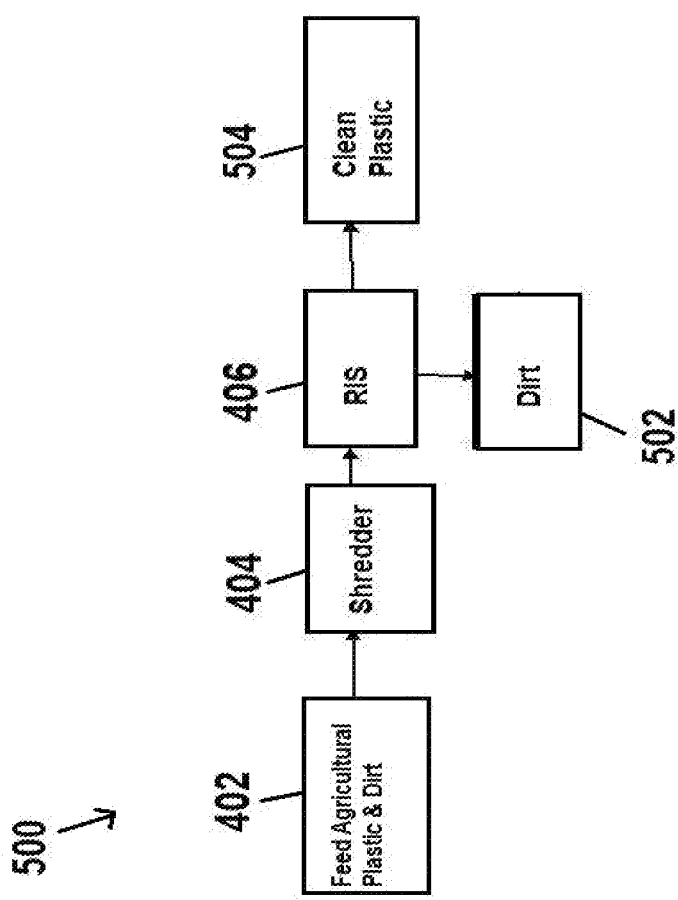
FIG. 5 is an illustration of an example method of recycling a material.

Referring to FIG. 5, another example of a method 500 for recovering two or more product streams from the feedstock 402 is illustrated. In some embodiments, the feedstock 402 may comprise a mixture of plastic and dirt. The feedstock 402 (e.g., comprising a mixture of plastic and dirt) can be delivered to the shredder 404, whereupon the feedstock 402 can be shredded. Following the shredding, the shredded feedstock 402 can be delivered to the rotary impact separator 406, whereupon the shredded feedstock 402 can be impacted and passed through the rotary impact separator 406. The resulting product stream from the rotary impact separator 406 may comprise dirt 502 that has been separated from clean plastic 504. In this way, the method 500 can comprise collecting a principal component stream (e.g., clean plastic 504 in this example) with reduced levels of the at least one secondary component (e.g., dirt, in this example).

Figure 6:
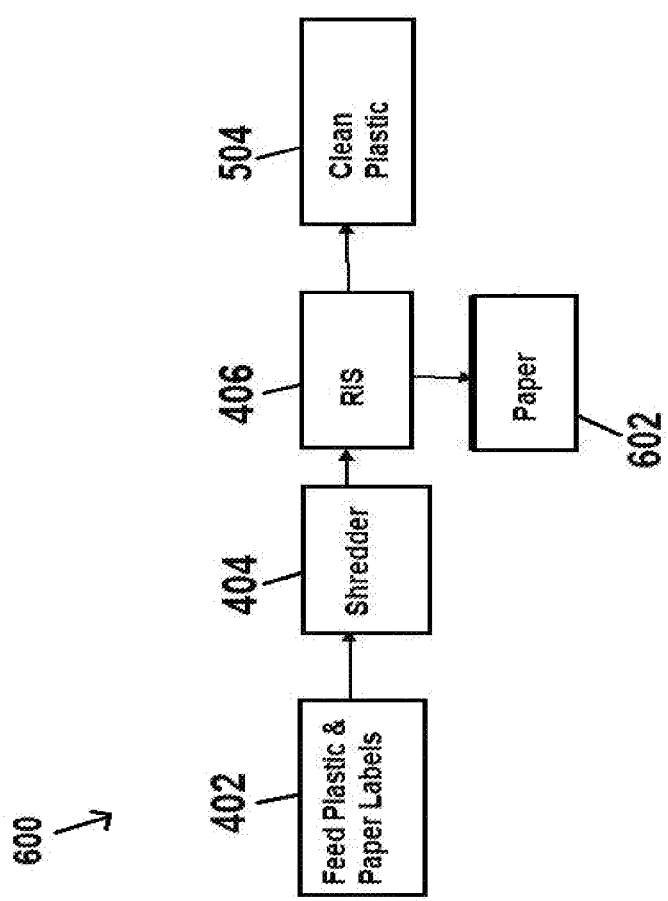
FIG. 6 is an illustration of an example method of recycling a material.

Referring to FIG. 6, another example of a method 600 for recovering two or more product streams from the feedstock 402 is illustrated. In some embodiments, the feedstock 402 may comprise a mixture of plastic and paper (e.g., plastic and paper labels). The feedstock 402 (e.g., comprising a mixture of plastic and paper labels) can be delivered to the shredder 404, whereupon the feedstock 402 can be shredded. Following the shredding, the shredded feedstock 402 can be delivered to the rotary impact separator 406, whereupon the shredded feedstock 402 can be impacted and passed through the rotary impact separator 406. The resulting product stream from the rotary impact separator 406 may comprise paper 602 that has been separated from the clean plastic 504. In this way, the method 500 can comprise collecting a principal component stream (e.g., clean plastic 504 in this example) with reduced levels of the at least one secondary component (e.g., paper, in this example).

EXAMPLES

Example 1

A sample of thin agricultural film (0.3 mm thick) contaminated with approximately 60% dirt was subjected to the following steps:
1. Shredded in a Weima single shaft shredder with about 2 inch (approximately 50 mm) screens.
2. Processed in a Rotary Impact Separator with a tip speed of about 120 feet per second (about 36 meters per second) and a 0.125 inch (about 4 mm) screen, creating a plastic-rich stream and a dirt-rich stream. More than 90% of the dirt on the feed plastic was removed. Plastic losses were less than 2% of feed Example 2

A sample of thick agricultural film (1.2 mm thick) contaminated with approximately 45% dirt was subjected to the following steps:
1. Shredded in a Weima single shaft shredder with about 2 inch (approximately 50 mm) screens.
2. Processed in a Rotary Impact Separator with a tip speed of about 120 feet per second (about 36 meters per second) and a 0.125 inch (about 4 mm) screen, creating a plastic-rich stream and a dirt-rich stream. More than 90% of the dirt on the feed plastic was removed. Plastic losses were less than 2% of feed.

Example 3

A sample of thick agricultural film (1.2 mm thick) contaminated with approximately 45% dirt was subjected to the following steps:
1. Cut into about 6 inch square pieces.
2. Processed in a Rotary Impact Separator with a tip speed of about 120 feet per second (about 36 meters per second) and a 0.125 inch (about 4 mm) screen, creating a plastic-rich stream and a dirt-rich stream. More than 95% of the dirt on the feed plastic was removed. Plastic losses were less than 1% of feed.

Example 4

A sample of mixed paper contaminated with approximately 12% plastic was subjected to the following steps:
1. Shredded in a single shaft shredder to a top size of about 6 inches (about 15 cm).
2. Processed in a Rotary Impact Separator with a tip speed of about 120 feet per second (about 36 meters per second) and a 0.75 inch (about 2 cm) screen, creating a plastic-rich stream and a paper-rich stream. More than 98% of the plastic contamination was removed from the paper-rich stream. Less than 5% of the paper was lost in the contaminant stream.

Example 5

A sample of mixed paper contaminated with approximately 8% plastic was subjected to the following steps:
1. Shredded in a single shaft shredder to a top size of about 6 inches (about 15 cm).
2. Hammer milled in a Bliss hammer mill to reduce particle size to a top size of about 1 inches (about 2.5 cm).
2. Processed in a Rotary Impact Separator with a tip speed of about 120 feet per second (about 36 meters per second) and a 0.75 inch (about 2 cm) screen, creating a plastic-rich stream and a paper-rich stream. More than 98% of the plastic contamination was removed from the paper-rich stream. Less than 5% of the paper was lost in the contaminant stream.

Example 6

A sample of mixed paper contaminated with approximately 6% plastic was subjected to the following steps:
1. Shredded in a single shaft shredder to a top size of about 6 inches (about 15 cm).
2. Hammer milled in a Bliss hammer mill to reduce particle size to a top size of about 1 inches (about 2.5 cm).
3. Fiberized in a Reynolds Equipment (Iowa) fiberizer to a top size of about ¼ inch (about 0.5 cm)
4. Processed in a Rotary Impact Separator with a tip speed of about 120 feet per second (about 36 meters per second) and a 0.5 inch (about 1 cm) screen, creating a plastic-rich stream and a paper-rich stream. More than 98% of the plastic contamination was removed from the paper-rich stream. Less than 5% of the paper was lost in the contaminant stream.

Example 7

A sample of agricultural plastic derived from planting trays contaminated with approximately 26% dirt was subjected to the following steps:
1. Cut into about 6 inch square pieces.

2. Processed in a Rotary Impact Separator with a tip speed of about 120 feet per second (about 36 meters per second) and a 0.125 inch (about 4 mm) screen, creating a plastic-rich stream and a dirt-rich stream. More than 95% of the dirt on the feed plastic was removed. Plastic losses were less than 1% of feed.

Example 8

A sample of agricultural plastic derived from flower pots contaminated with approximately 26% dirt was subjected to the following steps:
1. Cut into about 6 inch square pieces.
2. Processed in a Rotary Impact Separator with a tip speed of about 120 feet per second (about 36 meters per second) and a 0.125 inch (about 4 mm) screen, creating a plastic-rich stream and a dirt-rich stream. More than 95% of the dirt on the feed plastic was removed. Plastic losses were less than 1% of feed.

Example 9

A sample of post industrial plastic contaminated with paper tags and labels was subjected to the following steps:
1. Cut into about 4 inch pieces.
2. Processed in a Rotary Impact Separator with a tip speed of about 120 feet per second (about 36 meters per second) and a 0.125 inch (about 4 mm) screen, creating a plastic-rich stream and a paper-rich stream. More than 95% of the paper was removed from the plastic.

What is claimed is:

1. A method for recovering two or more product streams from a feedstock, the method comprising:
   receiving the feedstock comprising a principal component and at least one secondary component, wherein a friability of the principal component is different than the friability of the at least one secondary component, the feedstock falling in a direction of gravity into a rotary impact separator;
   passing the feedstock through the rotary impact separator comprising a body with one or more walls that define a chamber, an impact device that extends through the chamber, and a screen covering an outlet in the body below the impact device relative to the direction of gravity;
   rotating the impact device within the chamber and contacting the feedstock with the impact device; and
   collecting a principal component stream with reduced levels of the at least one secondary component by passing the principal component stream through the screen and the outlet, wherein an axis that extends perpendicular to a shaft of the impact device intersects the wall and not the screen above the impact device relative to the direction of gravity, and the same axis intersects the screen and the outlet and not the wall below the impact device relative to the direction of gravity.

2. The method of claim 1, wherein the feedstock comprises a polymeric material.

3. The method of claim 1, wherein the feedstock comprises a post-consumer polymeric material previously used in agriculture.

4. The method of claim 1, wherein the feedstock comprises post-industrial or post-consumer plastic, or mixtures thereof.

5. The method of claim 1 wherein the feedstock comprises a polymer-rich stream derived from a municipal recycling facility (MRF).

6. The method of claim 1, wherein the feedstock comprises a cellulose-rich stream.

7. The method of claim 1, wherein the feedstock comprises a stream derived from paper, newsprint, books or magazines.

8. The method of claim 1, wherein the feedstock comprises a stream derived from cardboard, corrugated cardboard, or packaging materials.

9. The method of claim 1, wherein the feedstock comprises a stream derived from recycled paper, mixed paper, recycled cardboard, or mixtures thereof.

10. The method of claim 1 wherein the feedstock comprises a cellulose-rich stream which has been partially or fully processed into cellulose-rich insulation.

11. The method of claim 1 wherein the feedstock comprises a cellulose-rich stream derived from a municipal recycling facility (MRF).

12. The method of claim 1, wherein the body comprises a top side, through which the feedstock is received through an inlet opening, and a bottom side, through which the principal component stream exits the rotary impact separator through the outlet, the top side located 180 degrees from the bottom side.

13. The method of claim 12, wherein the top side consists of a solid wall extending from the inlet opening to an exit end of the body, and the screen covers the outlet at the bottom side.

14. The method of claim 1, wherein the impact device is rotated at a rotational speed that is within a range from about 15 meters/second to about 75 meters/second, and wherein the screen comprises openings of about 2 millimeters to about 10 millimeters in size.

* * * * *